United States Patent [19]

Uzuka

[11] 4,455,515
[45] Jun. 19, 1984

[54] CONTROL CIRCUIT OF BRUSHLESS DC MOTOR

[75] Inventor: Mitsuo Uzuka, Urawa, Japan

[73] Assignee: Sony Corporation, Tokyo, Japan

[21] Appl. No.: 383,959

[22] Filed: Jun. 1, 1982

[30] Foreign Application Priority Data

Jun. 12, 1981 [JP] Japan .................. 56-90314

[51] Int. Cl.³ ............................... H02K 29/00
[52] U.S. Cl. .................. 318/254; 318/138; 318/439
[58] Field of Search ............ 318/254, 254 A, 138, 318/439, 711, 602

[56] References Cited

U.S. PATENT DOCUMENTS

| 3,378,741 | 4/1968 | Sutton | 318/602 X |
| 3,486,099 | 12/1969 | Brunner et al. | 318/254 A |
| 4,105,940 | 8/1978 | Kühnlein | 318/254 A X |
| 4,230,976 | 10/1980 | Müller | 318/254 A X |

Primary Examiner—B. Dobeck
Assistant Examiner—Bentsu Ro
Attorney, Agent, or Firm—Lewis H. Eslinger; Alvin Sinderbrand

[57] ABSTRACT

A brushless DC motor of the type including a rotor having a magnet for generating magnetic flux of alternating magnetic field polarities in a rotary path about its axis of rotation and a stator coaxial with the rotor and having a plurality of coils of respective phases in linking relation to the magnetic flux and adapted to be energized for the flow of current therethrough so as to produce a rotational torque, is provided with a control circuit in which switching transistors are connected with the coils of respective phases and are selectively turned ON in response to respective switching signals for energizing the respective coils, a switching signal generating circuit is normally responsive to the rotational position of the rotor for periodically changing its condition and thereby providing the switching signals to the switching transistors, and an additional switch device is connected to the switching signal generating circuit and is actuable to fix the condition of the latter so that only one of the switching transistors is continuously turned ON for energizing only the respective coil and thereby locking the rotor against rotation. Such locking of the rotor against rotation is particularly desirable in the case where the brushless DC motor is provided to directly drive a reel mount in a video tape recorder (VTR) or similar apparatus in which it is desired to prevent rotation of the reel mount during tape loading and unloading operations.

11 Claims, 10 Drawing Figures

FIG. 3
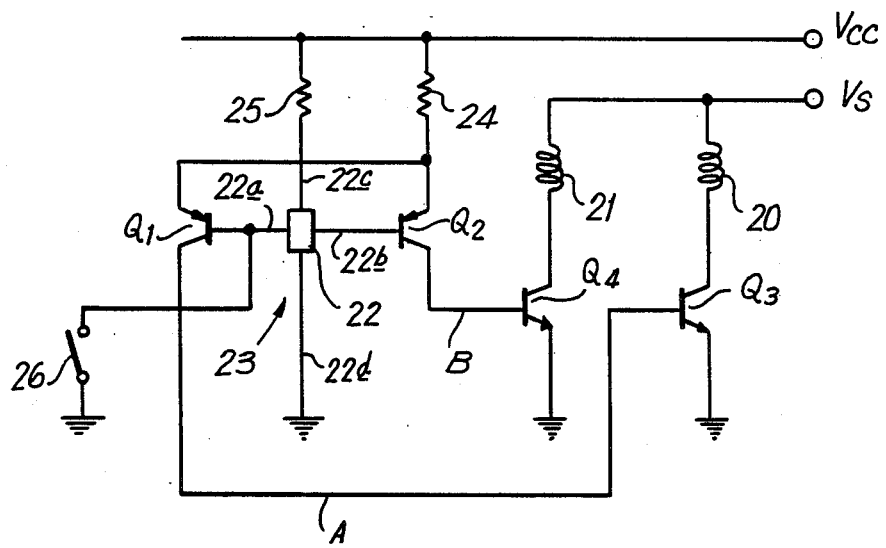
FIG. 4A
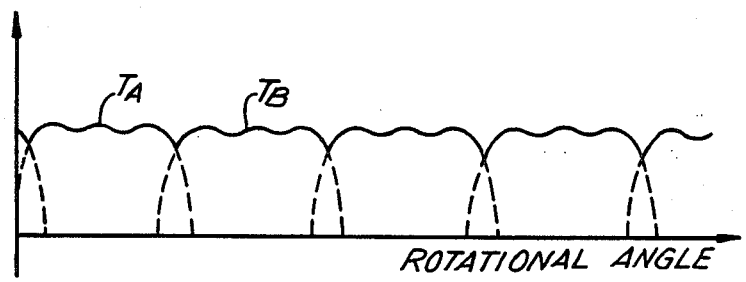
FIG. 4B
FIG. 4C
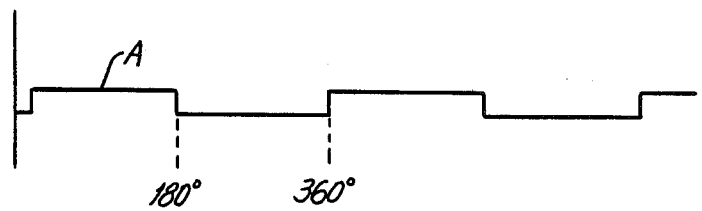

CONTROL CIRCUIT OF BRUSHLESS DC MOTOR

BACKGROUND OF THE INVENTION

1. Field of the Invention

This invention relates generally to a control circuit for a brushless DC motor, and more particularly is directed to an improvement in the control circuit for a brushless DC motor so as to particularly suit the latter for the direct drive of a reel mount in a video tape recording and/or reproducing apparatus or VTR.

2. Description of the Prior Art

In a VTR or similar apparatus of the type employing video cassettes, after a cassette is operatively positioned in the apparatus, a tape loading device is actuated to withdraw magnetic tape from the cassette and to wind or wrap the withdrawn tape around a guide drum carrying rotating heads by which video signals can be recorded on, or reproduced from the tape guided by the drum. When a recording or reproducing operation has been completed, removal of the cassette from the apparatus has to be preceded by a tape unloading operation during which the tape is unwrapped from the drum and returned to the cassette. During such tape loading or unloading operation, one of the reel mounts with which the tape-up and supply reels in the cassette are respectively rotatably coupled should be locked against rotation while the other reel mount is rotatable. Thus, during the tape loading operation, the tape to be withdrawn from the cassette for wrapping about the guide drum is unwound only from the tape reel coupled with the unlocked reel mount and, similarly, during the tape unloading operation, the tape unwrapped from the guide drum is returned to the cassette by being rewound only on the tape reel coupled with the unlocked reel mount. As a result of the foregoing, there is no moving or shifting of the tape from one to the other of the reels within the cassette by reason of a tape loading operation followed by an unloading operation.

In a VTR according to the prior art, during a tape loading or unloading operation, one of the reel mounts is locked against rotation by means of a brake belt or brake shoe which is spring urged against a drum surface on that reel mount and which is disengaged or released from the drum surface to free the reel mount for rotation during a recording or reproducing operation upon energizing of an electromagnet or solenoid having its armature suitably connected with the brake belt or shoe. However, such arrangement for selectively locking a reel mount against rotation is disadvantageous in that it employs a relatively large number of mechanical components, has a high power consumption for operation of the solenoid so that it is not suitable for use in a battery powered, portable VTR, and is noisy in operation when the solenoid attracts its armature.

OBJECTS AND SUMMARY OF THE INVENTION

Accordingly, it is an object of this invention to provide an arrangement by which a reel mount in a recording and/or reproducing apparatus, such as, a VTR, can be locked against rotation, and which is free of the previously mentioned disadvantages of the prior art.

More specifically, it is an object of this invention to provide a control circuit for a brushless DC motor by which the rotor thereof may be conveniently locked against rotation.

Another object of the invention is to provide a control circuit for a brushless DC motor, as aforesaid, which can be conveniently used for the direct drive of a reel mount, for example, in a VTR, so that, when the rotor is locked against rotation through the control circuit, the reel mount directly driven by the brushless DC motor will be similarly locked against rotation.

In accordance with an aspect of this invention, a brushless DC motor adapted for directly driving a reel mount in a VTR or the like and including a rotor having flux generating means for generating magnetic flux of alternating magnetic field polarity in a rotary path about the axis of rotation of the rotor, and a stator having a plurality of coils of respective phases in linking relation to the magnetic flux and adapted to be energized for current to flow therethrough and produce a rotational torque, is provided with a control circuit comprising a plurality of switching elements connected with the coils of respective phases and adapted to be selectively made operative in response to respective switching signals for energizing the coils of respective phases, a switching signal generating circuit normally responsive to the rotational position of the rotor for cyclically changing its condition and thereby providing the switching signals to the switching elements, and additional switching means connected to the switching signal generating circuit and being actuable to fix the condition of the switching signal generating circuit so that only one of the switching elements is made operative for energizing only the respective coil or coils and thereby locking the rotor against rotation about its axis.

The above, and other objects, features and advantages of this invention, will be apparent in the following detailed description of illustrative embodiments thereof when read in connection with the accompanying drawings in which corresponding parts are identified by the same reference numerals in the several views of the drawings.

BRIEF DESCRIPTION OF THE DRAWINGS

FIG. 3 is a circuit diagram of a control circuit according to an embodiment of this invention for a two-phase alternate switching type of a brushless DC motor;

FIGS. 4A, 4B and 4C are waveform diagrams to which reference will be made in explaining the operation of the control circuit of FIG. 3;

DESCRIPTION OF THE PREFERRED EMBODIMENTS

Figure 1:
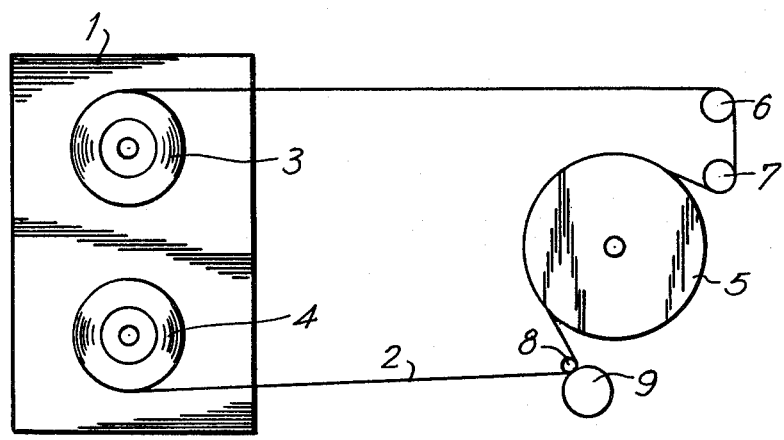
FIG. 1 is a schematic or simplified plan view of the essential elements of a tape transport system of a cassette-type VTR to which the present invention may be advantageously applied.

Referring to the drawings in detail, and initially to FIG. 1 thereof, it will be seen that, in the simplified cassette-type VTR there illustrated, an operatively positioned cassette 1 contains a magnetic tape 2 which is wound on a supply reel 3 and a take-up reel 4 rotatable within the cassette housing. When video signals are to be recorded on, or reproduced from tape 2, a tape loading device (not shown) is made operative to withdraw a portion of tape 2 from cassette 1 and to wrap the withdrawn tape about a portion of the periphery of a guide drum 5 which has rotary heads (not shown) associated therewith for recording and reproducing video signals on the tape. At the completion of a tape loading operation, tape 2 is led from supply reel 3 in the cassette housing around guide rollers or pins 6 or 7 to the surface of guide drum 5, and then from the latter between a capstan 8 and a pinch roller 9 and back to take-up reel 4 in the housing of cassette 1. During a recording or reproducing operation of the VTR, capstan 8 is suitably rotated so that tape 2 pressed against capstan 8 by pinch roller 9 is longitudinally driven at a constant speed, and a reel mount (not shown) engaged or rotatably coupled with take-up reel 4 is suitably rotated so that the tape being advanced or transported by capstan 8 will be wound or taken up on reel 4. If it is desired to effect rewind or fast-forward movement of tape 2, then a reel mount coupled with supply reel 3 or the reel mount coupled with take-up reel 4 is rotated in a suitable direction at a relatively high speed for effecting the correspondingly high speed transfer of tape 2 between reels 3 and 4. At the completion of a recording or reproducing operation of the VTR and prior to the removal of cassette 1 from the latter, the tape loading device of the VTR performs a tape unloading operation in which the tape 2 is unwrapped from about guide drum 5 and returned to within cassette 1. During each tape loading and unloading operation, one of the reel mounts with which supply and take-up reels 3 and 4 are respectively coupled should be locked against rotation while the other reel mount is left unlocked to be rotated for taking up the slack of the tape as the latter is unwrapped from drum 5. If, for example, the reel mount coupled with take-up reel 4 is the one which is locked during tape loading and unloading operations, then the tape to be withdrawn from cassette 1 for wrapping about guide drum 5 during a loading operation is unwound only from supply reel 3 and, similarly, during a subsequent tape unloading operation, the tape unwrapped from guide drum 5 is returned to cassette 1 by being rewound only on supply reel 3. As a result of the foregoing, there will be no moving or shifting of the tape from one to the other of reels 3 and 4 by reason of successive tape loading and unloading operations.

It is known to provide a VTR with reel mounts which are directly driven by respective reel motors. As shown on FIG. 2, each such reel motor for directly driving a respective one of the reel mounts in a VTR may be a brushless DC motor 10 which generally comprises a rotor assembly 11 and a stator assembly 12. The motor 10 further has a base or support plate 13 from which there extends a centrally located cylindrical support member 14 containing bearings in which a rotor shaft 15 is journaled. Rotor assembly 11 is shown to include a cup-shaped yoke 16 fixed to an end portion of shaft 15 for rotation therewith about the shaft axis, and permanent magnet north and south pole pieces 17 and 18 which are secured to the inner cylindrical side wall of cup-shaped yoke 16. Such pole pieces 17 and 18 are magnetized in the thickness direction such that the north and south poles, respectively, face inwardly, that is, toward shaft 15. Stator assembly 12 is shown to include a toroidal core 19 which is concentric with the axis of shaft 15, and a pair of stator coils 20 and 21 wound on opposed portions of core 19. The stator assembly 12 comprised of core 19 and coils 20 and 21 is suitably fixed on cylindrical support member 13 with a small gap provided between the inner circumferential surfaces of pole pieces 17 and 18 and the outer surfaces of coils 20 and 21.

It will be appreciated that, in motor 10, pole pieces 17 and 18 of rotor assembly 11 constitute flux generating means for generating magnetic flux of alternating magnetic field polarity in a rotary path about the axis of rotation of rotor assembly 11 defined by shaft 15. Coils 20 and 21 are in linking relation to such magnetic flux, so that, when coils 20 and 21 are selectively energized by a hereinafter described energizing or control circuit for causing current to flow alternately through one coil and then the other, a rotational torque is produced for rotating rotor assembly 11 and shaft 15 to which a reel mount of the VTR may be suitably secured.

Figure 2:
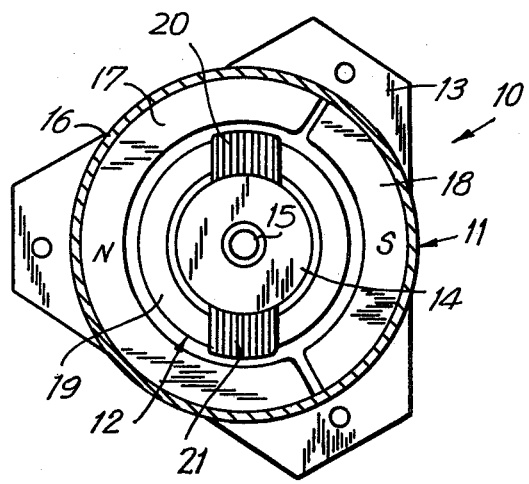
FIG. 2 is a plan view, partly in horizontal section, of a brushless DC motor of a type that may directly drive a reel mount in the VTR of FIG. 1, and that may be advantageously provided with a control circuit according to the present invention.

Generally, in accordance with this invention, a reel mount directly driven by the motor 10 described with reference to FIG. 2 is locked against rotation by electrically locking the motor through its energizing or control circuit. More particularly, reference to FIG. 3 will show that a drive circuit for a two-phase unidirectional or alternate switching type brushless DC motor as shown on FIG. 2, may comprise a Hall-effect element 22 which functions as a rotor position detecting device. The Hall-effect element 22, which does not appear on FIG. 2, may be suitably mounted on cylindrical support member 14 below rotor assembly 11 so as to sense the intensity and polarity of the magnetic flux generated by north and south pole pieces 17 and 18 and thereby produce position signals as a function of such detected flux. Hall-effect element 22 is shown on FIG. 3 to be part of a switching signal generating circuit 23 which further includes differential circuit means constituted by a pair of PNP transistors $Q_1$ and $Q_2$.

More particularly, transistors $Q_1$ and $Q_2$ have their base electrodes connected to output terminals 22a and 22b, respectively, of Hall-effect element 22, while the emitter electrodes of transistors $Q_1$ and $Q_2$ are connected in common through a suitable load resistor 24 to a power supply terminal at an elevated potential $V_{cc}$. Hall-effect element 22 is further shown to have current supply input terminals 22c and 22d respectively connected through a resistor 25 to the power supply terminal at potential $V_{cc}$ and to a terminal at ground potential. The collector electrodes of transistors $Q_1$ and $Q_2$ are connected to the base electrodes of NPN transistors $Q_3$ and $Q_4$, respectively, which function as switching transistors for coils 20 and 21, respectively, under the control of switching signals A and B from transistors $Q_1$ and $Q_2$ of switching signal generating circuit 23. More particularly, switching transistors $Q_3$ and $Q_4$ have their collector electrodes connected through stator coils 20 and 21, respectively, to a power supply terminal at which there is provided, for example, a servo voltage $V_s$ obtained from a suitable speed servo circuit (not shown), and the emitter electrodes of switching transistors $Q_3$ and $Q_4$ are connected to ground.

In the ordinary operation of the energizing or control circuit of FIG. 3, as rotor 11 rotates, the magnetic flux generated by north and south pole pieces 17 and 18 is detected by Hall-effect element 22 to generate sinusoidal voltages at outputs 22a and 22b which are 180° out of phase, and which cause transistors $Q_1$ and $Q_2$ to provide the switching signals A and B shown on FIGS. 4B and 4C, respectively. Switching transistors $Q_3$ and $Q_4$ are alternately turned ON during the intervals when the respective switching signals A and B are at their high levels. Thus, stator coils 20 and 21 of the illustrated two-phase alternate switching-type brushless DC motor are energized alternately at successive electrical angles of 180° to generate torques $T_A$ and $T_B$, respectively, as shown on FIG. 4A.

Brushless DC motors of the two-phase switching type frequently have two "rotational dead points" spaced apart by electrical angles of 180° and at which zero torque is developed. However, it is known to eliminate such "dead points", for example, as disclosed in detail in my U.S. Pat. No. 4,217,508, issued Aug. 12, 1980, and having a common assignee herewith, by arranging the magnetic flux linking each coil so that, if a coil is energized throughout a region of magnetic flux of predetermined polarity, a rotational torque of predetermined direction is produced through a range having an angle greater than 180 electrical degress. In one such arrangement disclosed in the patent, and shown on FIG. 2 hereof, each of the coils 20 and 21 is toroidally wound on the toroidal core 19 and the two coils are separated by 180° electrical degrees while one magnetic polarity of flux is asymmetric with respect to the other magnetic polarity, that is, north pole piece 17 subtends an angle of 240° with respect to the motor axis while south pole piece 18 subtends an angle of 120°. As described in detail in the above-identified patent, such arrangement of the flux generating means causes a rotational torque in one direction to be produced with respect to each of the coils through a range having an electrical angle greater than 180°, whereby the "dead points" are eliminated and ripple is reduced to a minimum, even though the energizing of control circuit of FIG. 3 energizes the coils 20 and 21 alternately for durations substantially equal to an electrical angle of 180°. Alternatively, the mentioned "dead points" may be eliminated by providing the field system or means for generating magnetic flux with auxiliary poles or with non-magnetized sections, or by providing the stator coils or armature system with windings of special configuration such that first and second current path portions of each coil through which the current flows in opposite directions are disposed on substantially the same cylindrical surface concentric with the motor axis and are separated from each other by an electrical angle of less than 180°, all as described in detail in my above-identified patent.

Returning to FIG. 3, it will be seen that in accordance with the embodiment of the invention there illustrated, a switch 26 is connected between output terminal 22a of Hall-effect element 22 and ground. The switch 26 is normally open, as shown, so as to avoid any interference with the normal alternate energizing of coils 20 and 21. However, when switch 26 is closed during a tape loading or unloading operation, for example, in response to a control signal to a drive motor (not shown) of the tape loading device, or by other means, transistor $Q_1$ is turned ON irrespective of the output 22a of Hall-effect element 22, whereby switching transistor $Q_3$ is turned ON and coil 20 is continuously energized so long as switch 26 remains closed.

If the emitter-collector saturation voltage of transistor $Q_1$ is made negligible or of substantially zero value when transistors $Q_1$ and $Q_3$ are ON, then the emitter of $Q_1$ is clamped at a potential with respect to ground which is equivalent to the base-emitter voltage $V_{BE}$ of transistor $Q_3$. Since the emitter of transistor $Q_1$ is connected with the emitter of transistor $Q_2$ and the output 22b of Hall-effect element 22 which is applied to the base electrode of transistor $Q_2$ is never lower than the ground potential for any rotational position of rotor 11 detected by element 22, the base-emitter voltage applied to transistor $Q_2$ cannot become high enough to turn ON transistor $Q_2$ so long as transistor $Q_1$ is ON. Therefore, so long as switch 26 is closed, transistor $Q_2$, and consequently also transistor $Q_4$, are turned OFF and coil 21 is de-energized.

Figure 5:
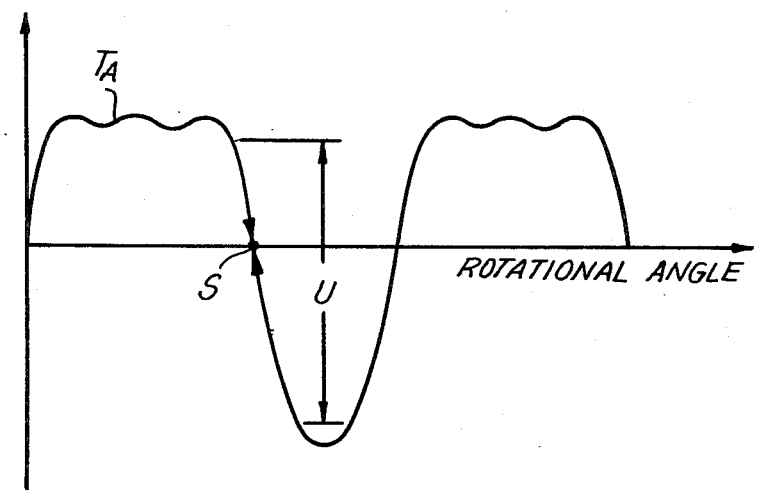
FIG. 5 is a graph showing the relation of torque to rotational angle of the rotor for the locked condition of the control circuit of FIG. 3.

As a result of the foregoing, only a torque $T_A$ of the A-phase is produced, as shown on FIG. 5, so that rotor 11 of motor 10 is locked at the rotational position S of zero torque. If rotor 11 drifts from the rotational position indicated at S, a torque is generated in the direction of one or the other of the arrows on FIG. 5 for returning the rotor to the position S. Thus, it will be seen that the rotational position S is a stable location of rotor 11 when only one of the coils 20 and 21 is energized, and a suitable torque or force is provided for returning the rotor to such stable position S against any external forces within the range U shown on FIG. 5. The stable position S of rotor 11 is that in which a N-S boundary between pole pieces 17 and 18 is positioned precisely adjacent the torque generating conductors of A-phase coil 20. Of course, a reel mount of the VTR rotatably coupled to the locked rotor 11 will be similarly held against turning during a tape loading or unloading operation.

Figure 6:
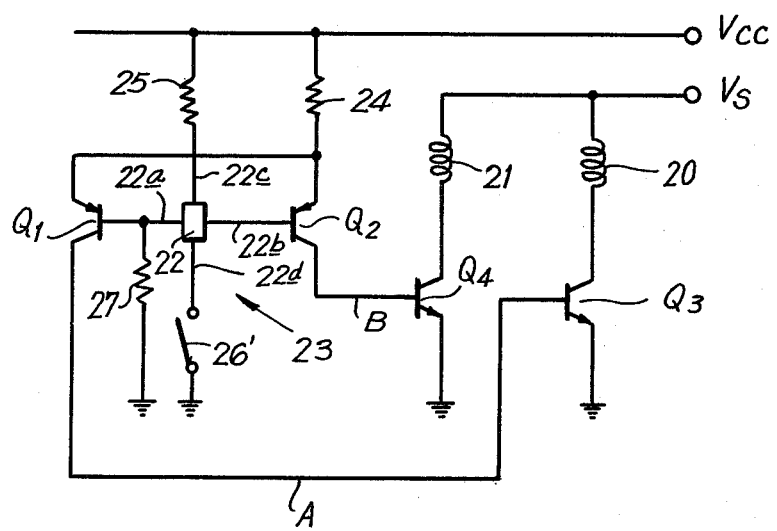
FIGS. 6, 7 and 8 are circuit diagrams similar to that of FIG. 3, but showing control circuits according to other respective embodiments of the invention.

Referring now to FIG. 6, it will be seen that, in a control circuit for a brushless DC motor according to another embodiment of this invention which is otherwise similar to the control circuit described above with reference to FIG. 3, a switch 26' for causing locking of rotor 11 of the motor against rotation is connected between the current supply terminal 22d of Hall-effect 22 and the power supply terminal which is at ground potential, and a resistor 27 of high resistance value is connected between output terminal 22a of Hall-effect element 22 and ground potential. In the embodiment of FIG. 6, switch 26' is normally closed so that the control circuit operates as earlier described to alternately energize coils 20 and 21 as rotor 11 is rotated, whereby to cause normal operation of motor 10, for example, as during a reproducing or recording operation of the VTR. However, when switch 26' is opened, as shown on FIG. 6, for example, during a tape loading or unloading operation, a base current of transistor $Q_1$ flows through resistor 27 to ground so that transistor $Q_1$ is turned ON so as to turn ON switching transistor $Q_3$, while transistor $Q_2$ is turned OFF and thereby turns OFF switching transistor $Q_4$. Therefore, current flows through the A-phase coil 20 with the result that rotor 11 is locked at the rotational position S on FIG. 5 in the same way as has been described above in respect to the embodiment of FIG. 3.

Figure 7:
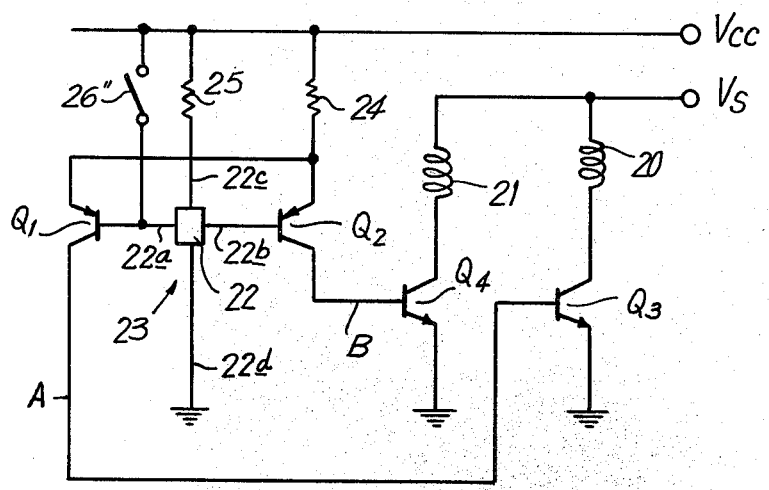

Referring now to FIG. 7, it will be seen that, in the control circuit according to the embodiment of the invention there illustrated, and which is otherwise the same as that described above with reference to FIG. 3, a switch 26" is connected between the power supply terminal which is at the elevated potential $V_{cc}$ and the output terminal 22a of Hall-effect element 22. In this cae, switch 26" is normally open, as shown on FIG. 7, so as to avoid interference with the normal operation of the control circuit in alternately energizing coils 20 and 21 as rotor 11 of the motor is rotated. However, when switch 26″ is closed during a tape loading or unloading operation, the relatively high potential thereby applied to the base electrode of switch $Q_1$ turns OFF the latter and, conversely, transistor $Q_2$ is turned ON. Thus, closing of switch 26″ causes switching transistor $Q_3$ to be turned OFF while switching transistor $Q_4$ is turned ON for continuously energizing the B-phase coil 21 with the result that rotor 11, and a reel mount coupled thereto, are locked against rotation similarly to the manner in which the locking of rotation has been described with reference to FIGS. 3 and 6.

Figure 8:
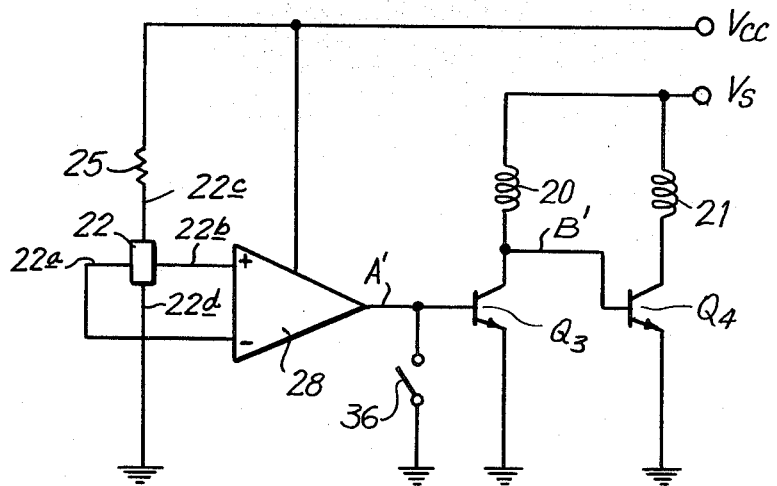

In each of the previously described embodiments of the invention, the switching signal generating circuit 23 has been comprised of Hall-effect element 22 and a differential circuit means constituted by transistors $Q_1$ and $Q_2$. However, as shown on FIG. 8, in still another embodiment of this invention, such differential circuit means may be constituted by a differential amplifier 28 having negative and positive inputs connected to output terminals 22a and 22b, respectively, of Hall-effect element 22 and providing a single differential circuit output A′ which is applied to the base electrode of switching transistor $Q_3$ as the switching signal for the latter. In the embodiment of FIG. 8, the collector of switching transistor $Q_3$ is further connected to the base electrode of switching transistor $Q_4$ so that a switching signal B′ for transistor $Q_4$ is merely derived from the collector electrode of transistor $Q_3$ as an inversion of the switching signal A′ for the latter.

In accordance with this invention, the control circuit of FIG. 8 is further shown to comprise a switch 36 connected between the single output of differential amplifier 28 and ground. The switch 36 is normally open, as shown, in which condition the control circuit of FIG. 8 operates to cause the alternate energizing of coils 20 and 21 for normal operation of the motor. In other words, so long as switch 36 is opened, the output A′ of differential amplifier 28 will correspond to the switching signal A of FIG. 4B so as to intermittently turn ON switching transistor $Q_3$ and thereby cause intermittent energization of A-phase coil 20. Whenever transistor $Q_3$ is turned ON, the level of switching signal B′ is lowered to turn OFF switching transistor $Q_4$ and, conversely, whenever switching transistor $Q_3$ is turned OFF, the level of switching signal B′ is increased to turn ON switching transistor $Q_4$. Thus, switching signal B′ will correspond to the signal B shown on FIG. 4C so that B-phase coil 21 is energized alternately in respect to the A-phase coil 20.

When switch 36 is closed, for example, during a tape loading or unloading operation of the VTR, the voltage at the base electrode of switching transistor $Q_3$ is continuously lowered to turn OFF transistor $Q_3$, whereby its collector voltage is increased to turn ON transistor $Q_4$. Accordingly, current flows only through B-phase coil 21 for locking the rotor of the motor against rotation in the same manner as has been previously described.

It will be appreciated that, in all of the above described embodiments of the invention, locking of the rotor 11 is achieved electrically, that is, merely by the actuation of switch 26, 26′, 26″ or 36. Although illustrated in the form of a mechanical switch, it is apparent that switch 26, 26′, 26″ or 36 may be in the form of an electronic switch consisting of a transistor or the like. It will be seen that the described arrangements for locking the rotor of the motor involve a minimum of additional components, can be completely noise-free in operation, and have minimum power consumption so as to be readily applicable to portable, battery-powered VTRs. Further, although the invention has been shown applied to a brushless DC motor of the two-phase alternate switching type, the invention can be applied similarly to other brushless DC motors of the unidirectional switching type having more than two phases. Moreover, although specific reference has been made of the application of the invention to the tape transport system of a VTR, it will be obvious that the invention can be similarly applied to any other apparatus in which it is desired to selectively lock an electric motor against rotation.

Having specifically described illustrative embodiments of the invention with reference to the accompanying drawings, it is to be understood that the invention is not limited to those precise embodiments, and that various changes and modifications can be effected therein by one skilled in the art without departing from the scope or spirit of the invention as defined in the appended claims.

What is claimed is:

1. A control circuit for driving and instantanously stopping rotary motion in a brushless DC motor of the kind including a rotor rotatable about an axis and having flux generating means for generating magnetic flux of alternating magnetic field polarity in a rotary path about said axis, and a stator coaxial with said rotor and having a plurality of coil means of respective phases in linking relation to said magnetic flux and adapted to be energized for current to flow therethrough and produce a rotational torque to continuously rotate the motor, said control circuit comprising:

a plurality of switching elements connected with said coil means of respective phases and adapted to be selectively made operative, in response to respective switching signals, for energizing said coil means of respective phases;

a switching signal generating circuit normally responsive to the rotational position of said rotor for changing its condition and thereby providing said switching signals to said switching elements;

a power supply having terminals at ground potential and at an elevated potential in respect thereto; and additional switching means connected to said power supply and to said switching signal generating circuit and being actuable to connect said switching signal generating circuit to one of said terminals to provide a clamping voltage to fix said condition of the switching signal generating circuit so that only one of said switching elements is made operative for energizing only the respective coil means and thereby locking said rotor against rotation about said axis.

2. A control circuit for a brushless DC motor according to claim 1; in which said brushless DC motor is of the 2-phase alternate switching type, said coil means includes A-phase and B-phase coils, said switching elements include first and second switching transistors through which said A-phase and B-phase coils are respectively energized when said first and second switching transistors, respectively, are turned ON, said switching signals include first and second switching signals of opposed phase controlling said first and second switching transistors, respectively, and each of said switching signals changes between high and low values at each electrical angle of 180°.

3. A control circuit for a brushless DC motor according to claim 2; in which said switching signal generating circuit includes a Hall-effect element responsive to said rotational position of the rotor and having two outputs, and differential circuit means connected with said two outputs of the Hall-effect element and having first and second differential circuit outputs from which said first and second switching signals, respectively, are applied to control electrodes of said first and second switching transistors.

4. A control circuit for a brushless DC motor according to claim 3; in which said Hall-effect element and said differential circuit means are connected between said power supply terminals at ground potential and at an elevated potential in respect thereto, respectively; and in which said switching means is connected between one of said outputs of said Hall-effect element and one of said power supply terminals so that, upon closing of said switching means, one of said switching signals is clamped at a high voltage level and the other of said switching signals is maintained at a low level for causing energization of only one of said A-phase and B-phase coils.

5. A control circuit for a brushless DC motor according to claim 4; in which said switching means is connected between said one output of the Hall-effect element and said power supply terminal which is at ground potential.

6. A control circuit for a brushless DC motor according to claim 4; in which said switching means is connected between said one output of the Hall-effect element and said power supply terminal which is at said elevated potential.

7. A control circuit for a brushless DC motor according to claim 3; in which said Hall-effect element has current supply inputs connected with said power supply terminals at ground potential and at an elevated potential in respect thereto, respectively; and in which said switching means is connected between one of said inputs of the Hall-effect element and said power supply terminal at ground potential, and further comprising a resistor connected between one of said outputs of the Hall-effect element and said power supply terminal at ground potential.

8. A control circuit for a brushless DC motor according to claim 3; in which said differential circuit means includes first and second detecting transistors each having an emitter, a base connected to a respective output of said Hall-effect element and a collector at which a respective one of said switching signals is derived, and a resistor through which the emitters of said detecting transistors are connected in common to said terminal at an elevated potential of said power supply.

9. A control circuit for a brushless DC motor according to claim 2; in which said switching signal generating circuit includes a Hall-effect element connected to said power supply and responsive to said rotational position of the rotor and having two outputs, a differential circuit connected to be powered by said power supply and having a pair of inputs receiving said outputs, respectively, of said Hall-effect element and a single differential circuit output at which one of said switching signals is derived for controlling one of said switching transistors, and means for deriving the other of said switching signals from said one switching transistor as an inversion of said one switching signal; and in which said switching means is connected between said differential circuit output and said ground terminal of said power supply.

10. A control circuit for a brushless DC motor according to claim 9; in which each of said first and second switching transistors includes a base, emitter and collector, said single differential circuit output is applied to said base of said first switching transistor, and said means for deriving the other switching signal includes a connection from said collector of the first switching transistor to said base of the second switching transistor.

11. A control circuit for a brushless DC motor according to claim 10; in which said differential circuit includes a differential amplifier having positive and negative inputs receiving said outputs, respecively, of said Hall-effect element.

* * * * *